US012773815B2

(12) United States Patent
Lappe et al.

(10) Patent No.: US 12,773,815 B2
(45) Date of Patent: Oct. 27, 2026

(54) METHOD FOR PRODUCING A CONTAINER COMPRISING FIBERS AND DEVICE FOR CARRYING OUT THE METHOD

(71) Applicant: Krones AG, Neutraubling (DE)

(72) Inventors: Ulrich Lappe, Neutraubling (DE); Jörg Zacharias, Köfering (DE); Yvette Freese, Regensburg (DE); Andreas Hippel, Wörth (DE)

(73) Assignee: KRONES AG, Neutraubling (DE)

(*) Notice: Subject to any disclaimer, the term of this patent is extended or adjusted under 35 U.S.C. 154(b) by 202 days.

(21) Appl. No.: 18/454,640

(22) Filed: Aug. 23, 2023

(65) Prior Publication Data

US 2024/0066768 A1 Feb. 29, 2024

(30) Foreign Application Priority Data

Aug. 25, 2022 (DE) ......................... 102022121489.3

(51) Int. Cl.

*B29C 45/00* (2006.01)
*B65D 41/04* (2006.01)
*B65D 65/40* (2006.01)
*B65D 65/42* (2006.01)
*B65D 65/46* (2006.01)
*B29K 311/14* (2006.01)
*B29L 1/00* (2006.01)
*B29L 31/56* (2006.01)

(52) U.S. Cl.

CPC .......... *B29C 45/0001* (2013.01); *B65D 41/04* (2013.01); *B65D 65/40* (2013.01); *B65D 65/42* (2013.01); *B65D 65/466* (2013.01); *B29K 2311/14* (2013.01); *B29L 2001/00* (2013.01); *B29L 2031/565* (2013.01)

(58) Field of Classification Search

CPC ............. B29C 45/0001; B29K 2311/14; B29L 2001/00; B29L 2031/565
USPC ........................................................... 264/129
See application file for complete search history.

(56) References Cited

U.S. PATENT DOCUMENTS 5,936,014 A * 8/1999 Voigt ........................ C08L 3/06 524/51
2004/0245672 A1 12/2004 Bengtsson
(Continued)

FOREIGN PATENT DOCUMENTS

CN 1585692 A 2/2005
DE 69318798 T2 9/1998
(Continued)

OTHER PUBLICATIONS

English translation of JP2003081205 (Year: 2003).*
(Continued)

*Primary Examiner* — Christina A Johnson
*Assistant Examiner* — Xue H Liu
(74) *Attorney, Agent, or Firm* — McCoy Russell LLP

(57) ABSTRACT

The disclosure relates to a method for producing a container comprising fibers, wherein the method comprises producing at least one part of the container by means of an injection molding method using a fiber-containing fluid mass. The disclosure further relates to a device for carrying out the method, wherein the device comprises an injection molding device for producing the at least one part of the container by means of an injection molding method using a fiber-containing fluid mass.

19 Claims, 3 Drawing Sheets

(56) References Cited

U.S. PATENT DOCUMENTS

| | | | | |
|---|---|---|---|---|
| 2005/0153118 | A1* | 7/2005 | Licata | B32B 29/00 428/292.7 |
| 2006/0065992 | A1* | 3/2006 | Hutchinson | B29C 45/1646 264/320 |
| 2006/0278601 | A1 | 12/2006 | Bloom et al. | |
| 2010/0000902 | A1 | 1/2010 | Roberts et al. | |
| 2022/0034039 | A1* | 2/2022 | Pal | D21H 17/28 |
| 2025/0040684 | A1* | 2/2025 | Drillon | A61K 8/8129 |

FOREIGN PATENT DOCUMENTS

| | | | | |
|---|---|---|---|---|
| DE | 102005010206 | A1 | 9/2006 | |
| DE | 102020119413 | A1 | 1/2022 | |
| DE | 102021103400 | A1 | 8/2022 | |
| JP | 2003081205 | A * | 3/2003 | B29C 45/14 |

OTHER PUBLICATIONS

European Patent Office, Extended European Search Report Issued in Application No. 23190850.0, Feb. 5, 2024, Germany, 14 pages.

China National Intellectual Property Administration, Office Action and Search Report Issued in Application No. 202311051521.5, Mar. 28, 2026, 19 pages. (Submitted with Partial Translation).

* cited by examiner

METHOD FOR PRODUCING A CONTAINER COMPRISING FIBERS AND DEVICE FOR CARRYING OUT THE METHOD

CROSS REFERENCE TO RELATED APPLICATION

The present application claims priority to German Patent Application No. 10 2022 121 489.3 filed on Aug. 25, 2022. The entire contents of the above-listed application are hereby incorporated by reference for all purposes.

TECHNICAL FIELD

The disclosure relates to a method for producing a container comprising fibers and a device for carrying out the method according to the independent claims.

BACKGROUND

For everyday use of containers filled with product, resealability is desirable. This applies, for example, to larger containers that have a filling capacity of more than 0.2 liters of a beverage and are generally not emptied in one go and should be resealable for further use, transport and/or storage in a safe, stable and simple manner.

For a container containing fibers, neither suitable threads nor suitable closures are known, which in each case also fibers.

SUMMARY

Object

The object of the disclosure is to provide a method and a device that allow the production of a container comprising fibers and having sufficient strength and stability.

Achievement

The object is achieved by the method and the device as described herein.

The method for producing a container comprising fibers according to the disclosure comprises producing at least a part of the container by means of an injection molding method using a fiber-containing fluid mass.

The fibers in the fiber-containing fluid mass may be or comprise, for example, natural fibers and/or vegetable components. The fiber-containing fluid mass can be or comprise pulp. The fluid portion of the mass can comprise water.

For example, the fiber-containing fluid mass may comprise additives for influencing chemical and/or physical properties of the fibers.

By means of the injection molding method, fiber-containing fluid mass provided in a storage container can be injected under pressure into an injection molding tool by means of a conveying and metering apparatus. A cavity of the injection molding tool may thereby determine the shape and the surface structure of the at least one part of the container to be produced.

The injection molding tool may comprise a porous material such that fluid of the fiber-containing fluid mass may drain and/or escape. For example, additional drying of the at least one part of the container in the injection molding tool may be provided by heating the injection molding tool.

The fiber-containing fluid mass may comprise biodegradable fibers, for example cellulose fibers or wood fibers.

The fiber-containing fluid mass may comprise additives, for example starch, chalk, citrus fibers, lignin, and/or wax, such as beeswax or carnauba wax. Starch, chalk, citrus fibers, lignin may harden during subsequent drying of the at least one part of the container. Drying may be carried out at ambient temperature or by heating an injection molding tool in which the at least one part of the container may be produced during the injection molding method.

The method may further comprise coating the at least one part after producing, for example with wax, such as beeswax or carnauba wax. A coating may minimize permeation of gas, moisture absorption, and/or light transmission.

The method may further comprise disposing the at least one part on a main body of the container.

The main body of the container may comprise container parts that, together with the at least one part of the container, form a container. For example, if the at least one part is a head piece, the main body of the container may comprise a bottom, a side part, and shoulder part. The head piece may be arranged on the shoulder part.

The arranging may include adhering the at least one produced part to the main body. The at least one part may have first been produced from the fiber-containing fluid mass by means of the injection molding method, and then the produced part may be adhered to the main body.

The arranging may comprise injection-molding on the at least one part to the main body using the injection molding method to produce the at least one part. The production of the at least one part can thus be combined with the arranging to the main body. The main body may be provided first, and the at least one part may then be injected-molded on from the fiber-containing fluid mass using the injection molding method, whereby a connection of the at least one part being produced to the main body and simultaneously the production of at least one part can take place.

The at least one part may comprise at least one of a cap; thread; support ring; threaded strand; an annular surface; a shoulder region; a head piece; a thread and a support ring; a thread and a shoulder region; a support ring and a shoulder region; a support ring, a thread and a shoulder region; a container.

A cavity of an injection molding tool, which may be used for the injection molding method, for example, may thereby determine the shape and surface structure of the at least one part of the container to be produced, such as the shape and surface structure of a cap, the shape and surface structure of a thread, the shape and surface structure of a support ring, or the shape and surface structure of a shoulder region, and so forth.

The cap may comprise a height, wherein for example, the cap comprises an internal layer. The layer may include oxygen scavengers.

Different widths of threaded sections and/or different heights may be provided for caps.

The method may further comprise providing a main body of the container.

The main body may have been previously produced by means of an injection molding method using a fiber-containing fluid mass, for example by means of the injection molding method used to produce the at least one part of the container. Or, the main body may have been previously produced by means of another method suitable for use with a fiber-containing fluid mass. For example, the same fiber-containing fluid mass as used in the injection molding method of the at least one part of the container or a fiber-containing fluid mass having a different composition may be used.

The fiber-containing fluid mass may have thermoplastic properties. The fiber-containing fluid mass may comprise a base material, which may comprise a single material or a plurality of different materials, and a fluid, which may comprise a single fluid type or a plurality of fluid types. The base material may comprise fibers of one origin or fibers of different origins. The fibers may be or comprise primary or secondary fibers, or may be or comprise wood fibers or fibers from annual plants. The base material may further comprise starch, such as corn starch, rice starch, wheat starch, and/or potato starch. The base material may additionally or alternatively comprise modified cellulose, such as, for example, CMC (carboxymethyl cellulose) and/or HPMC (hydroxypropyl methylcellulose). The base material may further or alternatively comprise modified starch, such as starch ether and/or starch ester. The base material may further or alternatively comprise one or more additives, such as citric acid and/or lecithin.

Such a fiber-containing fluid mass, which may have thermoplastic properties, may be used, for example, in a method for producing a cap by means of the injection molding method. For example, this process may be carried out as a co-extrusion process.

Through the co-extrusion process, one or more additional layers can be formed and, for example, properties of the cap can be achieved. For example, the additional layer(s) may serve as a barrier and/or a surface finish.

In the co-extrusion process, a second layer may also comprise fibers in addition to the first layer. The second layer may further comprise one or more biopolymers, such as polylactide (PLA), polyhydroxyalkanoate (PHA), polybutylene adipate terephthalate (PBAT), or natural-based materials, such as beeswax, carnauba wax, casein, and/or alginate.

The base material may be in the form of granules or powder or paste. Storage, transport and shelf life can be optimized in this way. In a first embodiment, the base material may be added to an extruder, for example, it may be melted in the extruder. In a second embodiment, the components of the base material, for example its individual components, can be combined in a compounder and mixed there. The injection molding method can then be carried out in each case and, for example, the fiber-containing fluid mass can be fed to an injection mold. The injection mold can be provided for forming a cap. For example, after cooling, the injection mold may be opened and the cap may be removed.

The cap may be freely moldable as a result of being produced by means of the injection molding method. It can have good stability and, for example, a good haptic.

In this way, the fibers can be used as filler. It may not be necessary for the fibers to meet specific requirements to enable cap production.

A device for carrying out the method as described above or further below comprises an injection molding device for producing the at least one part of the container by means of an injection molding method using a fiber-containing fluid mass.

The device may further comprise at least one storage container for providing fiber-containing fluid mass. By means of a conveying and metering apparatus of the device, this mass can be injected into an injection molding tool under pressure. The injection molding tool may be comprised by the device. Various types of injection molding tools may be available to be able to produce different shaped types of the at least one part of the container. A cavity of the injection molding tool may thereby determine the shape and the surface structure of the at least one part of the container to be produced. The injection molding tool may comprise a porous material to allow fluid of the fiber-containing fluid mass to drain and/or escape after injection of the mass into the injection molding tool. The device may further comprise a heating device of the injection molding tool for additional drying of the at least one part of the container in the injection molding tool by heating the injection molding tool by means of the heating device.

The device may further comprise a coating device for coating the at least one part. A coating can be applied with wax, such as beeswax or carnauba wax.

The device may further comprise an arranging device for arranging the at least one part on the main body of the container. The arranging device may be configured for adhering the at least one part to the main body or for injection-molding on by means of the injection molding method.

The device may further comprise an insertion device for inserting an internal layer into the cap.

The device may further comprise a provision device for providing a main body of the container. The provision device may be configured to provide an already produced main body. Or, the provision device may be configured to provide the main body by producing by means of an injection molding method using a fiber-containing fluid mass, for example by means of the injection molding method used to produce the at least one part of the container, or by means of another method suitable for the use of a fiber-containing fluid mass. For example, the same fiber-containing fluid mass as used in the injection molding method of the at least one part of the container or a fiber-containing fluid mass having a different composition may be used.

BRIEF DESCRIPTION OF THE FIGURES

The accompanying Figures show, by way of example, aspects and/or exemplary embodiments of the disclosure for better understanding and illustration. In the figures.

DETAILED DESCRIPTION

Figure 1:
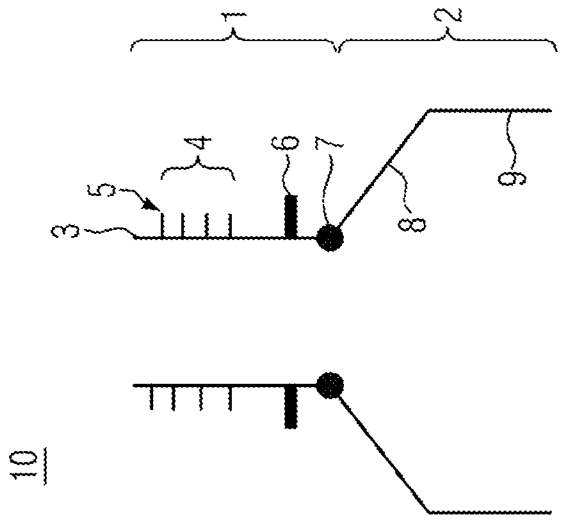
FIG. 1 shows a sectional view of a head piece arranged on a main body of the container.

FIG. 1 shows a sectional view of a head piece 1 arranged on a main body 2 of the container 10. The head piece 1 in this case is the at least one part of the container 10, which was produced by means of an injection molding method according to the disclosure using a fiber-containing fluid mass.

The head piece 1 comprises a neck part 3, a thread 4 and a support ring 6. In order to produce the thread 4, a threaded strand 5 can be produced together with the neck part 3, or the threaded strand 5 can be arranged on the neck part 3 after it has been produced.

The main body 2 of the container 10 comprises a shoulder part 8, a side part 9 and a bottom not shown. The main body 2 may have been previously produced by means of an injection molding method using a fiber-containing fluid mass, for example by means of the injection molding process used to produce the head piece 1. Or, the main body 2 may have been previously produced by means of another method suitable for the use of a fiber-containing fluid mass. For example, the same fiber-containing fluid mass used to produce the head piece 1 or a fiber-containing fluid mass with a different composition may be used for the main body 2.

To form the container 10, the head piece 1 is connected to the main body 2 by means of a connection 7. The connection 7 can be made by arranging the head piece 1 on the shoulder part 8 by means of adhesive bonding, or the head piece 1 can be injection-molded on the shoulder part 8 by means of the injection molding method.

Figure 2:
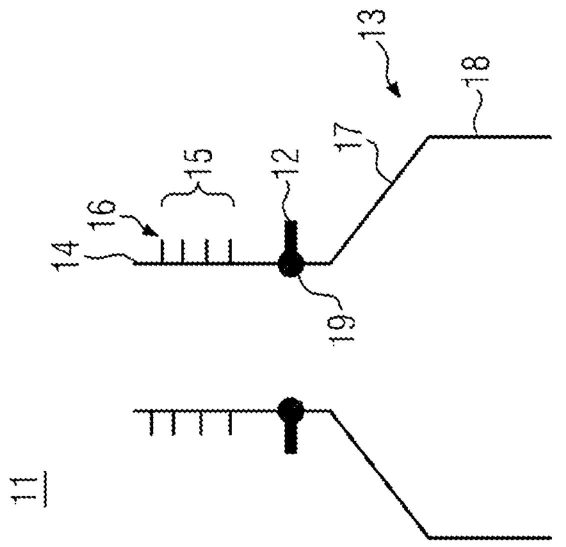
FIG. 2 shows a sectional view of a supporting ring arranged on a main body of the container.

FIG. 2 shows a sectional view of a support ring 12 arranged on a main body 13 of the container 11. The support ring 12 in this case is the at least one part of the container 11 which has been produced by means of an injection molding method according to the disclosure using a fiber-containing fluid mass.

The main body 13 of the container 11 comprises a neck part 14, a thread 15 having a threaded strand 16, a shoulder part 17, a side part 18, and a bottom not shown. The main body 13 may have been produced as already described with respect to FIG. 1.

To form the container 11, the support ring 12 is connected to the main body 13 by means of a connection 19. The connection 19 may be made by arranging the support ring 12 on the neck part 14 by means of adhesive bonding, or the support ring 12 may be injection-molded on the neck part 14 by means of the injection molding method.

Figure 3:
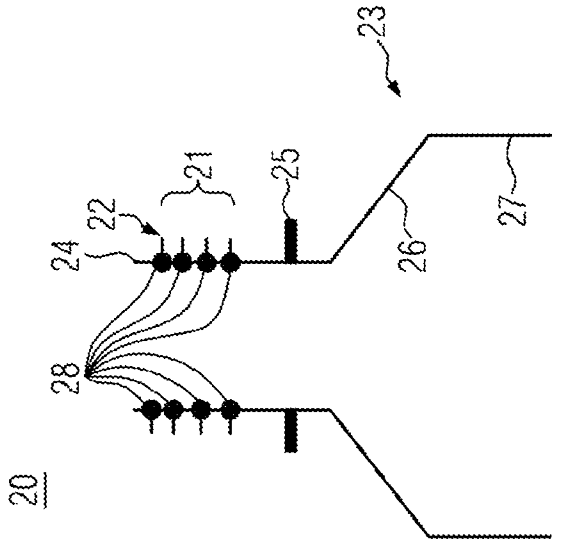
FIG. 3 shows a sectional view of a thread arranged on a main body of the container.

FIG. 3 shows a sectional view of a thread 21 having threaded strand 22 arranged on a main body 23 of the container 20. The thread 21 having the threaded strand 22, which spirals around a neck part 24 of the main body 23, is in this case the at least one part of the container 20 which has been produced by means of an injection molding method according to the disclosure using a fiber-containing, fluid mass.

The main body 23 of the container 20 comprises a neck part 24, a support ring 25, a shoulder part 26, a side part 27, and a bottom not shown. The main body 23 may have been produced as already described with respect to FIG. 1.

To form the container 20, the threaded strand 22 of the thread 21 is spirally connected to the main body 23 by means of a connection 28. The connection 28 may be made by arranging the threaded strand 22 on the neck part 24 by means of adhesive bonding, or the threaded strand 22 can be injection-molded on the neck part 24 by means of the injection molding method.

Figure 4:
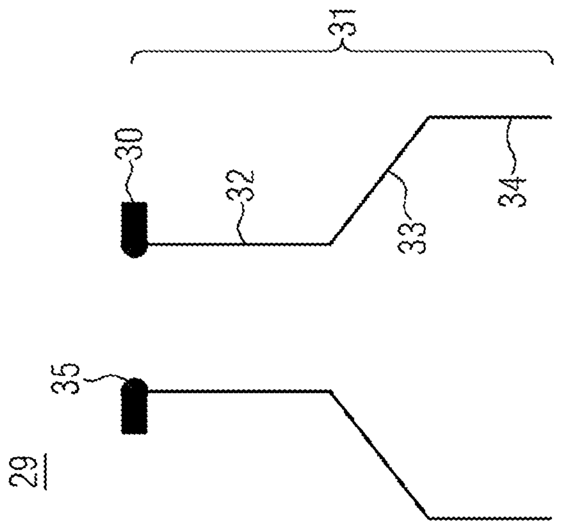
FIG. 4 shows a sectional view of an annular surface arranged on a main body of the container.

FIG. 4 shows a sectional view of an annular surface 30 arranged on a main body 31 of the container 29. Here, the annular surface 30 is the at least one part of the container 29 which has been produced by means of an injection molding method according to the disclosure using a fiber-containing fluid mass.

The main body 31 of the container 29 comprises a neck part 32, a shoulder part 33, a side part 34, and a bottom not shown. The main body 31 may have been produced as already described with respect to FIG. 1.

To form the container 29, the annular surface 30 is connected to the main body 31 by means of a connection 35. The connection 35 may be made by arranging the annular surface 30 on the neck part 32 by means of adhesive bonding, or the annular surface 30 can be injection-molded on the neck part 32 by means of the injection molding method. The annular surface 30 may be provided for the application of a seal.

Figure 5:
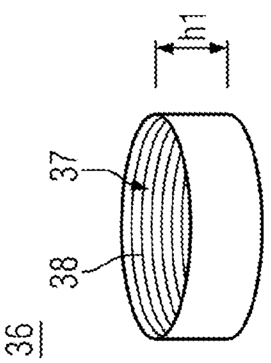
FIG. 5 shows a first embodiment of a cap.

FIG. 5 shows a first embodiment of a cap 36 comprising an internal thread 37. The cap 36 has a height h1. The threaded strand 38 has a first width.

Figure 6:
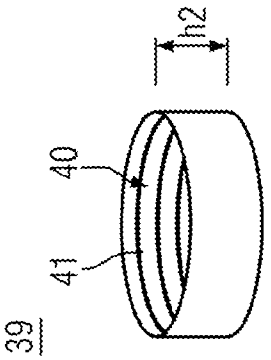
FIG. 6 shows a second embodiment of a cap.

FIG. 6 shows a second embodiment of a cap 39 comprising an internal thread 40. The cap 39 has a height h2, which may be equal to the height h1 of the cap 36 of the first embodiment. The threaded strand 41 has a second width, which may be greater than the first width of the threaded strand 38 of the first embodiment.

Figure 7:
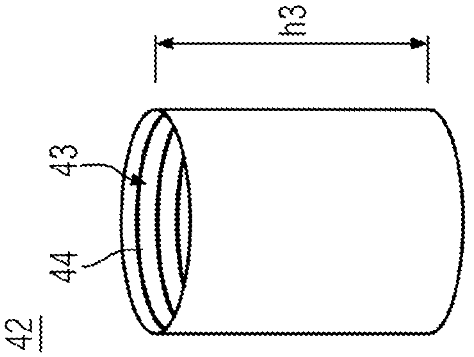

FIG. 7 shows a third embodiment of a cap 42 comprising an internal thread 43. The cap 42 has a height h3 that may be greater than the heights h1 and h2 of the first and second embodiments, respectively. The threaded strand 44 has a third width, which may be equal to the second width of the threaded strand 41 of the second embodiment.

Figure 8:
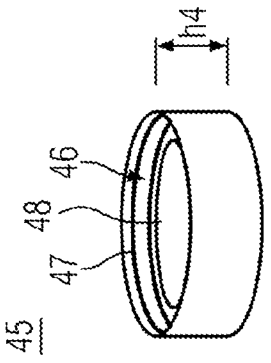
FIG. 7 shows a third embodiment of a cap and FIG. 8 shows a fourth embodiment of a cap.

FIG. 8 shows a fourth embodiment of a cover 45 comprising an internal thread 46. The cap 45 has a height h4 that may be less than the heights h3 of the third embodiment. The threaded strand 47 has a fourth width, which may be equal to the third width of the threaded strand 44 of the third embodiment. In addition, the cap 45 comprises an internal layer 48 that may comprise, for example, an oxygen scavenger.

The invention claimed is:

1. A method for producing a container comprising fibers, wherein the method comprises:

producing at least one part of the container by means of an injection molding method using a fiber-containing fluid mass, the fiber-containing fluid mass being pulp, wherein a fluid portion of the mass comprises water, wherein the fiber-containing fluid mass comprises a base material, which comprises a single material or a plurality of different materials, and a fluid comprising a single fluid type or a plurality of fluid types, wherein the base material comprises fibers of one origin or fibers of different origins, wherein the fibers comprise primary or secondary fibers or wood fibers or fibers from annual plants, wherein by the injection molding method, the fiber-containing fluid mass provided in a storage container is injected under pressure into the injection molding tool by a conveying and metering apparatus, and wherein a cavity of the injection molding tool thereby determines shape and surface structure of the at least one part of the container to be produced, wherein the injection molding tool comprises a porous material such that fluid of the fiber-containing fluid mass drains and/or escapes.

2. The method according to claim 1, wherein the fiber-containing fluid mass comprises biodegradable fibers, and/or wherein the fiber-containing fluid mass comprises additives.

3. The method according to claim 1, further comprising coating the at least one part after production.

4. The method according to claim 1, further comprising arranging the at least one part on a main body of the container, wherein, the arranging comprises adhering the produced at least one part to the main body, or wherein the arranging comprises an injection-molding on of the at least one part to the main body by means of the injection molding method for producing the at least one part.

5. The method according to claim 1, wherein the fiber-containing fluid mass has thermoplastic properties.

6. The method according to claim 5, wherein the base material is in the form of granules or powder or paste prior to use in the injection molding method, wherein the base material is combined in a compounder and mixed there.

7. The method according to claim 5, wherein a cap is produced by means of the injection molding method, wherein, a co-extrusion process is carried out, wherein, the co-extrusion process forms one or more additional layers, wherein properties of the cap are achieved.

8. The method according to claim 1, wherein the at least one part comprises at least one of:

a cap,
a thread,
a support ring,
a threaded strand,
an annular surface,
a shoulder region,
a head piece,
a thread and a support ring,
a thread and a shoulder region,
a support ring and a shoulder region,
a support ring, a thread and a shoulder region,
a container.

9. The method according to claim 7, wherein the cap comprises a height, wherein, the cap comprises an internal layer.

10. The method according to claim 1, further comprising: providing a main body of the container.

11. The method according to claim 1, wherein the base material further comprises starch, wherein the base material additionally or alternatively comprises modified cellulose, wherein the base material additionally or alternatively comprises modified starch, wherein the base material additionally or alternatively comprises one or more additives.

12. The method according to claim 3, wherein the coating includes wax.

13. The method according to claim 2, wherein the additives include starch, chalk, citrus fibers, lignin and/or wax.

14. The method according to claim 7, wherein the co-extrusion process forms a first additional layer and a second additional layer and wherein in addition to the first additional layer, the second additional layer also comprises fibers.

15. The method according to claim 11, wherein the starch is including corn starch, rice starch, wheat starch, and/or potato starch.

16. The method according to claim 11, wherein the modified cellulose is including carboxymethylcellulose and/or hydroxypropyl methylcellulose.

17. The method according to claim 11, wherein the modified starch is including starch ether and/or starch ester.

18. The method according to claim 11, wherein the one or more additives are including citric acid and/or lecithin.

19. The method according to claim 12, wherein the wax is including beeswax or carnauba wax.

* * * * *